United States Patent [19]

Chino et al.

[11] Patent Number: 5,311,382
[45] Date of Patent: May 10, 1994

[54] PINCH ROLLER URGING DEVICE FOR VIDEO INFORMATION RECORDING/READING APPARATUS

[75] Inventors: Hisayoshi Chino; Osamu Shimizu, both of Kanagawa, Japan

[73] Assignee: Sony Corporation, Japan

[21] Appl. No.: 917,337

[22] Filed: Jul. 23, 1992

[30] Foreign Application Priority Data

Jul. 29, 1991 [JP] Japan .................................. 3-188455

[51] Int. Cl.$^5$ ............................................. G11B 5/027
[52] U.S. Cl. ...................................... 360/85; 242/194
[58] Field of Search ............. 360/84, 85, 95, 96.1; 242/194

[56] References Cited

U.S. PATENT DOCUMENTS

| | | | |
|---|---|---|---|
| 4,225,894 | 9/1980 | Fulukawa et al. | 360/74.1 |
| 4,403,266 | 9/1983 | Kamimura et al. | 360/105 |
| 4,636,887 | 1/1987 | Kato et al. | 360/95 |
| 4,731,684 | 3/1988 | Suzuki | 360/85 |
| 5,021,899 | 6/1991 | Kotoda | 360/85 |
| 5,021,900 | 6/1991 | Yamashita et al. | 360/85 |

FOREIGN PATENT DOCUMENTS

| | | | |
|---|---|---|---|
| 74860 | 5/1982 | Japan | 360/85 |
| 2072923 | 10/1981 | United Kingdom | 360/105 |

*Primary Examiner*—John H. Wolff
*Assistant Examiner*—Allen Cao
*Attorney, Agent, or Firm*—Ronald P. Kananen

[57] ABSTRACT

A pinch roller urging mechanism adapted for use in a magnetically recording and reading apparatus includes primary and auxiliary link mechanisms operated by main and subsidiary plunger solenoids. The primary and auxiliary link mechanisms are operatively coupled to each other so that the primary link mechanism is operated by both or either one of the main and subsidiary plunger solenoids.

4 Claims, 5 Drawing Sheets

PINCH ROLLER URGING DEVICE FOR VIDEO INFORMATION RECORDING/READING APPARATUS

BACKGROUND OF THE INVENTION

The present invention relates to a magnetic reading and recording apparatus for use with a magnetic tape, and more specifically to a device for urging a pinch roller against a capstan roller in such an apparatus.

An apparatus for reading and recording information on a magnetic tape, such as, for example, a video tape recorder, may, as is known in the art, include a rotary head drum carrying a magnetic head, a capstan roller for transporting a magnetic tape via the head drum, a pinch roller for urging the magnetic tape against the capstan roller, and a device for driving the pinch roller. The pinch roller urging device may typically include a reciprocally moving link and a rotary arm connected to the link.

However, the pinch roller urging device allows the pinch roller to urge the magnetic tape against the capstan roller in both the PLAY and STOP operation modes of the apparatus. The force applied on the pinch roller in the STOP mode causes the pinch roller to become deformed, thereby disturbing the smooth transport of the magnetic tape.

There is a great demand for a pinch roller urging device which will control the pinch roller without deforming the pinch roller and which will smoothly transport the magnetic tape.

SUMMARY OF THE INVENTION

A principal object of the present invention is to provide a pinch roller urging device, adapted for operating a pinch roller of an apparatus for reading and recording information on a magnetic tape, which, upon operation of the apparatus, suitably urges the pinch roller against a capstan roller without deformation of the pinch roller.

Another object of the present invention is to provide a pinch roller urging device capable of accomplishing a smooth transport of a magnetic tape when reading or recording information on the tape.

The present invention provides a pinch roller urging device adapted for use in a magnetic recording and reading apparatus, comprising a base, primary and auxiliary link mechanisms for urging a pinch roller, and main and subsidiary drive means for operating the primary and auxiliary link mechanisms, respectively. The main and subsidiary drive means are secured to the base and connected to the primary and auxiliary link mechanisms, respectively. The primary and auxiliary link mechanisms are operatively coupled to each other so that the primary link mechanism is operated by both or one of the main and subsidiary drive means.

DESCRIPTION OF THE PREFERRED EMBODIMENT

Figure 1:
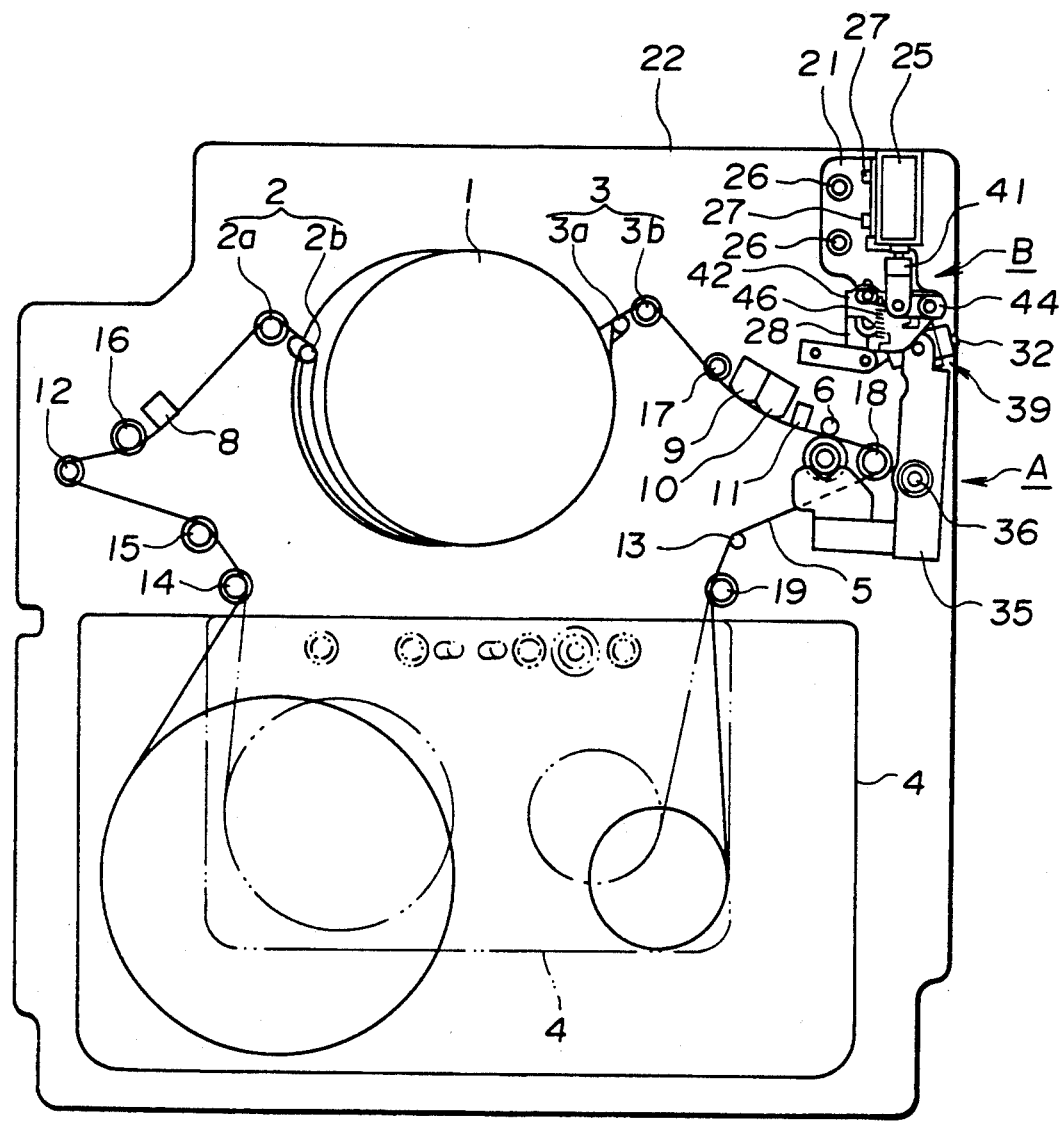
FIG. 1 is a plan view of a video tape recording apparatus which includes one preferred embodiment of a pinch roller urging device according to the present invention.
Figure 2:
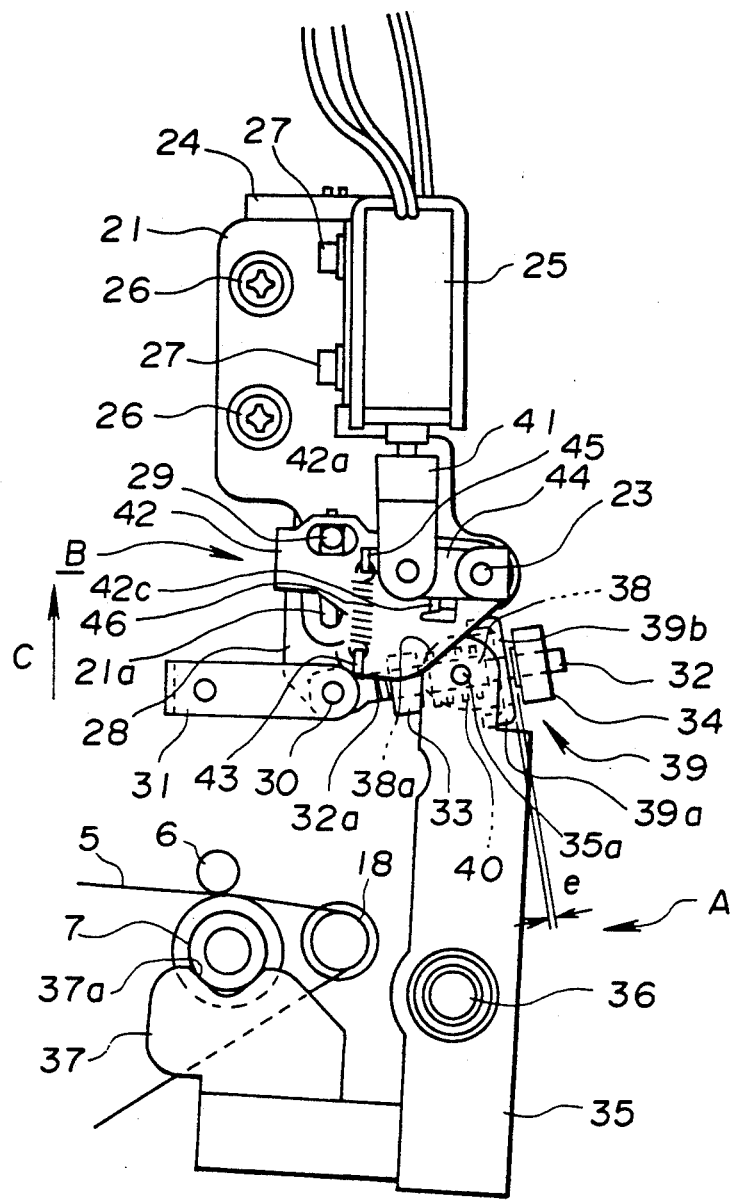
FIG. 2 is an enlarged plan view of the pinch roller urging device of FIG. 1, which includes primary and auxiliary mechanisms in tape transport state.
Figure 3:
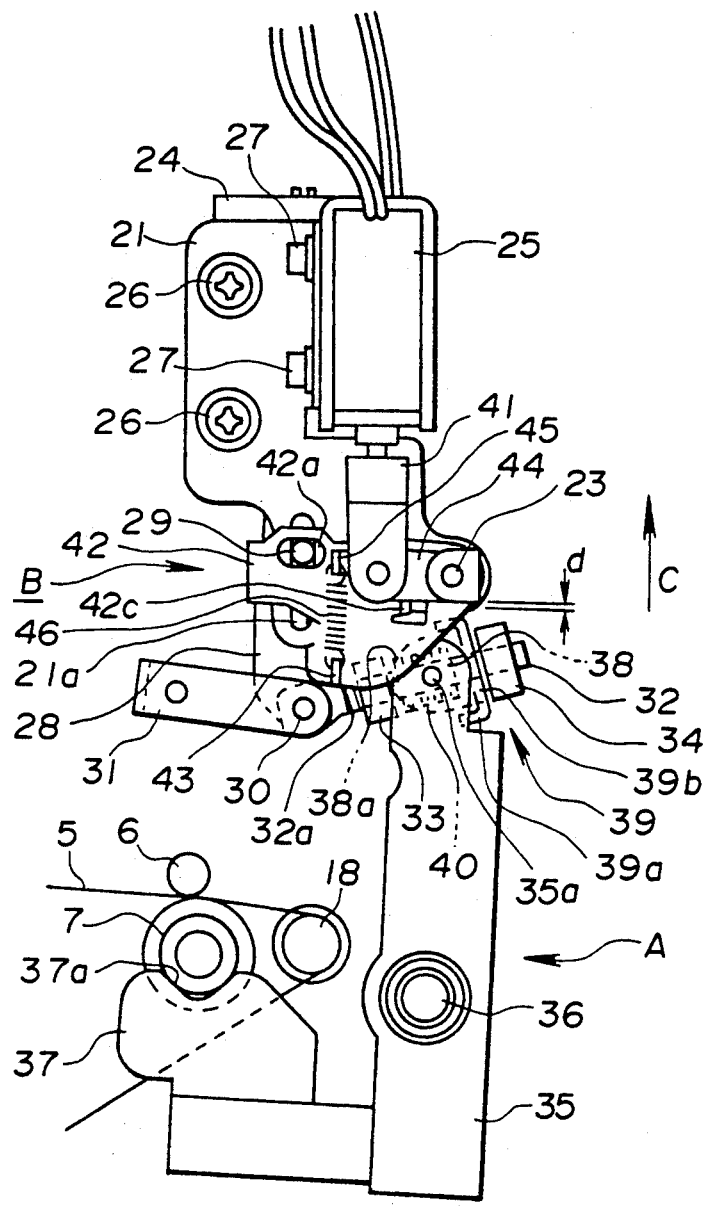
FIG. 3 is an enlarged plan view of the pinch roller urging device of FIG. 1, which includes the primary and auxiliary mechanisms in pinch during the stop state where a magnetic tape temporarily stops its travel.
Figure 4:
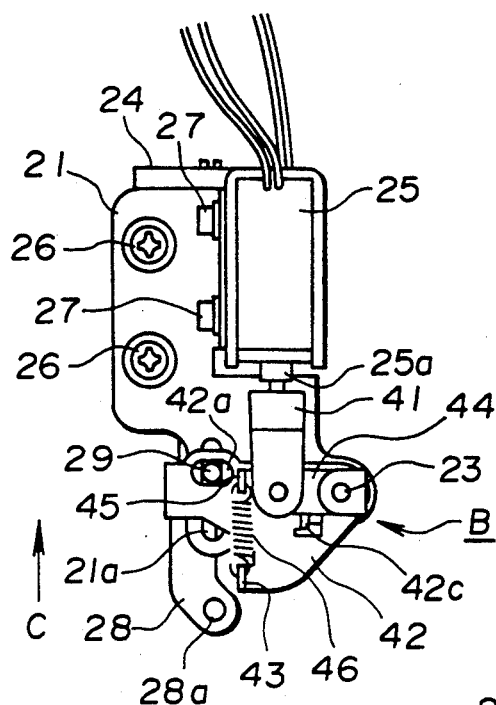
FIG. 4 is a plan view of the auxiliary mechanism.
Figure 5:
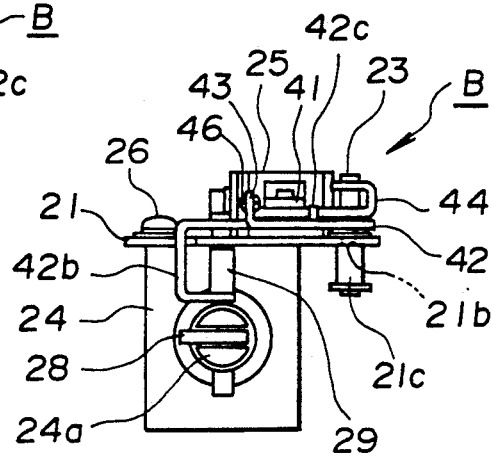
FIG. 5 is a front view of the auxiliary mechanism of FIG. 4.
Figure 6:
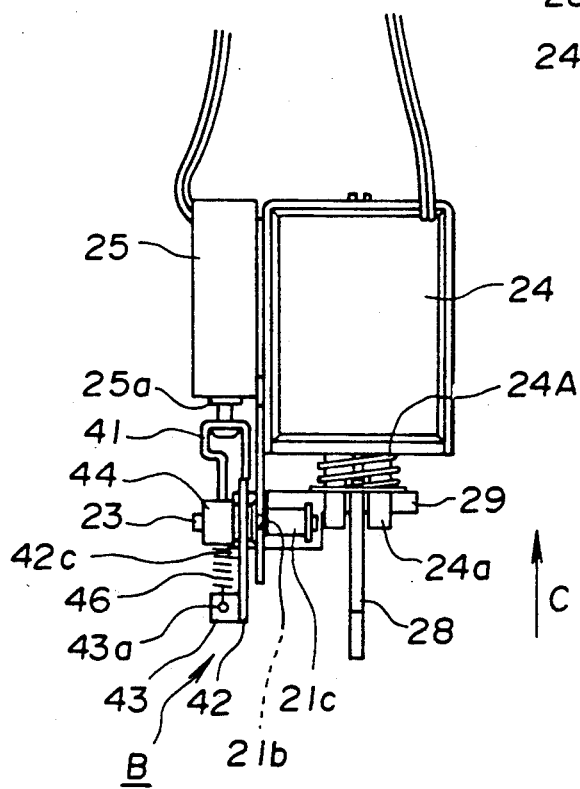
FIG. 6 is a side view of the auxiliary mechanism of FIG. 4.

Referring now to FIG. 1, there is shown a video tape recorder on which a pinch roller urging device according to the present invention is mounted. As shown in FIG. 1, the video tape recorder includes a housing (not shown), a chassis 22 enclosed within the housing, and a rotary head drum 1 mounted on the chassis 22. Disposed on each side of the rotary head drum 1 there are two sets of guide rollers 14 to 16 and 17 to 19, a pair of tape guides 2 and 3, and a pair of tension detectors 12 and 13. The tape guides 2 and 3 each include a guide roller and a slant guide 2a, 2b, and 3a, 3b, respectively. A capstan roller 6 and a pinch roller 7 are disposed opposite to each other on one side of the rotary head drum 1. Reference numerals 8, 9, 10 and 11 indicate a full erase head, an audio erase head, an audio control head and a confidence head, respectively. Detachably mounted on the chassis 22 is a tape cartridge 4 which includes a supply reel, a take-up reel and a magnetic tape 5 connected at its both ends on the respective reels. The tape 5 drawn from the supply reel passes over the guide rollers 14 to 17, the tension detector 12, the heads 8 to 11, the tape guides 2 and 3, and then travels between the capstan roller 6 and the pinch roller 7, via the guide rollers 18 and 19 and the tension detector 13, to the take-up reel. Thus, there is provided on the chassis 22 a tape path extending from the supply reel to the take-up reel of the tape cartridge 4. The pinch roller 7 is urged against the capstan roller 6 by a pinch roller urging device which is disposed outside the tape path, preferably at a rear corner of the chassis 22.

as shown in FIGS. 1 to 3, the pinch roller urging device comprises a base 21 mounted on the chassis 22. The base 21 has a main portion, an upright portion extending upward from one end of the main portion, i.e. the right end as viewed in FIG. 1, and two extensions which extend forward and rightward from a front end of the main portion, respectively. As best shown in FIGS. 5 and 6, main and subsidiary plunger solenoids 24 and 25 are secured to the main portion and the upright portion of the base 21 by means of screws 26 and 27, respectively. The main plunger solenoid 24 includes a plunger 24a having an outer end which is engaged and connected with a main link 28 by a pin 29. The pin 29 is fitted into an oval guide hold 21a formed on the forward extension of the base 21 as shown in FIG. 4. As seen in FIG. 6, numeral 24A indicates a return spring wound around the plunger 24a so as to urge the outer end of the plunger 24a outward from the main plunger solenoid 24 upon de-energization.

As shown in FIGS. 2 to 4, the main link 28 is has a bent end provided with a throughhole 28a into which a pin 30 is fitted. The main link 28 is rotatably connected through the pin 30 to a bar-like transmission link 32 as seen in FIGS. 2 and 3.

The transmission link 32 has one end formed with the threaded portion 32a to which an annular stopper 33 with a threaded inner circumferential face is fitted, and the other end on which an annular stopper 34 is mounted. The annular stopper 33 abuts against a flange 38a of a sleeve 38 securely mounted around the transmission link 32 as seen in FIGS. 2 and 3. Secured to the flange 38a is one end of a compression coil spring 40. The coil spring 40 is arranged around the sleeve 38. A pin bracket 39 is slidably mounted on the transmission link 32 adjacent the stopper 34. The pin bracket 39 includes a lateral body portion 39a having a central aperture through which the transmission link 32 penetrates, and two walls 39b opposingly extending from the body portion 39a in an axial direction of the transmission link 32. The other end of the coil spring 40 is connected to the lateral body portion 39a of the pin bracket 39 so that the pin bracket 39 is urged by the coil spring 40 toward the stopper 34. The walls 39b of the pin bracket 39 are connected to an L-shaped oscillating arm 35 by means of a pin 35a.

As seen in FIGS. 2 and 3, the L-shaped oscillating arm 35 includes a larger distance portion having a distal end pivotally mounted on the walls 39b of the pin bracket 39 through the pin 35a. A mid-portion of the larger distance portion is pivotally supported on a shaft 36 secured to the chassis 22. A smaller distance portion of the oscillating arm 35, which extends from the larger distance portion in a direction substantially perpendicular to the larger distance portion, is provided with a pinch roller urging piece 37. The pinch roller urging piece 37 has a V-shaped groove 37a to which the pinch roller 7 is fitted.

As shown in FIGS. 2 and 3, a pin retainer arm 31 is pivotally connected at one end thereof to the pin 30. The other end of the pin retainer arm 31 is pivotally mounted on the chassis 22. The pin retainer arm 31 serves for limiting forward and backward movement of the pin 30 which results from fore and aft movement of the main link 28 upon energization and de-energization of the main plunger solenoid 24.

As best shown in FIGS. 4 and 5 on the rightward extension of the base 21 there is mounted a cylindrical rod support 21c extending downwardly therefrom and having an aperture 21b through which a rod 23 passes. A guide arm 42 is rotatably mounted on an upper end of the rod 23 which projects upwardly from the aperture 21b. The guide arm 42 is formed with an oval hole 42a into which distal end of the pin 29 is fitted, and an L-shaped bent flange 42b depending downward from a left end of the guide arm 42 so that a flat edge of the bent flange 42b is brought into contact with the pin 29 as seen FIG. 5.

Mounted on a top end of the rod 23 is a transmission arm 44 as shown in FIGS. 4 to 6. The transmission arm 44 has a U-shaped bent end rotatably supported on the rod 23. Rotation of the transmission arm 44 around the rod 23 is limited by a stopper 42c which is formed on a right portion of a guide arm 42 and which extends upwardly therefrom. Another distal end of the transmission arm 44 is formed with an upright spring support 45 for supporting a tension coil spring 46. As seen in FIGS. 4 and 6, the tension coil spring 46 has one end hooked to a hole (not shown) of the spring support 45 and the other end hooked to a hole 43a of a spring support 43 extending upwardly from a front end of the guide arm 42. The tension coil spring 46 is designed to have a smaller biassing force than the compression coil spring 40.

As shown in FIG. 4, a subsidiary link 41 is connected to an end portion of the transmission arm 44 remote from the U-shaped bent end. The subsidiary link 41 is connected to a distal end of a plunger 25a which projects forward out of the subsidiary plunger solenoid 25.

In the drawings, reference characters A indicate a primary link mechanism including the main link 28, the transmission link 32 and the oscillating arm 35, and the reference characters B indicate an auxiliary link mechanism including the subsidiary link 41, the guide arm 42 and the transmission arm 44. An arrow C indicates a direction of movement of the primary and auxiliary link mechanisms.

Figure 7:
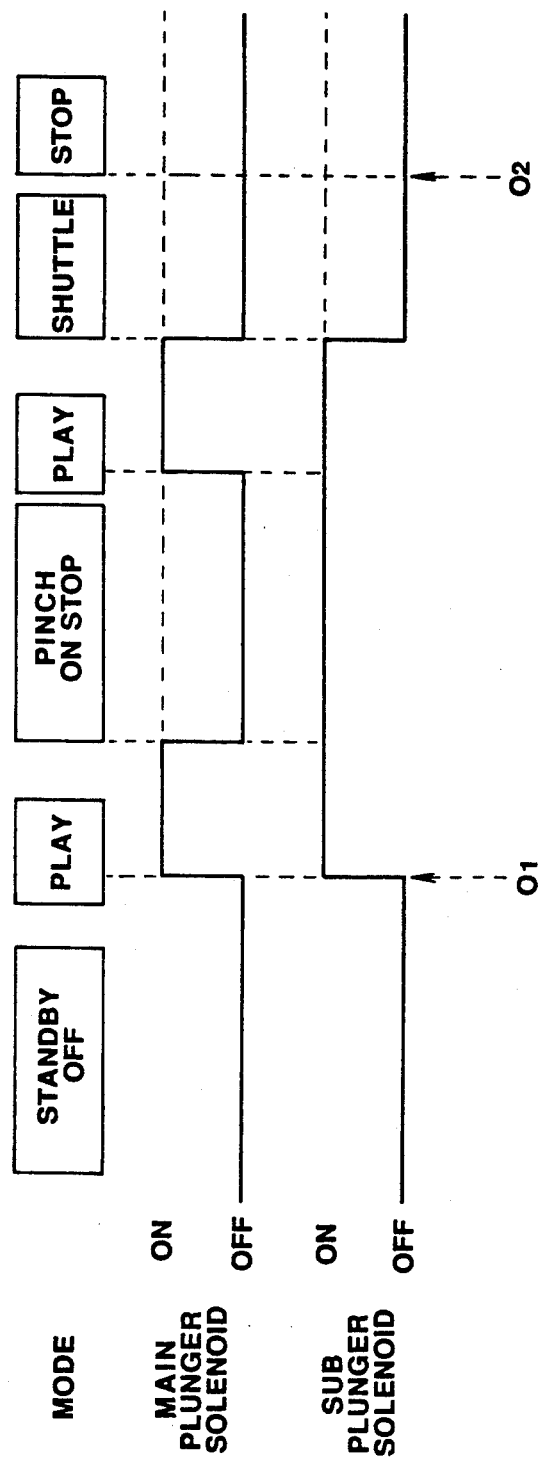
FIG. 7 is a diagram showing a relationship between operation modes of the apparatus and ON/OFF states of main and subsidiary plunger solenoids used in the primary and auxiliary mechanisms.

In PLAY mode in FIG. 7, the main plunger solenoid 24 is ON so that the main link 28 moves in its rearward direction due to retraction of the plunger 24a into the main plunger solenoid 24, as indicated at the arrow C in FIG. 2. The rearward movement of the main link 28 causes an associated rearward movement of the pin 30, so that a right end of the transmission link 32 moves rightward while rotating clockwise relative to the pin 30. At this time, a position of the stopper 34 relative to a moving direction of the pin 30 is offset rightward by a distance "e" as indicated in FIG. 2. Since the pin bracket 39 is always urged by the compression coil spring 40 so as to abut against the stopper 34, the pin bracket 39 is also offset rightward by a distance "e" from the in situ position. Associated with such a rightward offset movement of the pin bracket 39, the oscillating arm 35 rotates clockwise around the shaft 36 whereby the pinch roller urging piece 37 is urged against the pinch roller 7 as indicated in FIG. 2. The force applied to the pinch roller 7 causes the magnetic tape 5 to be urged against the capstan roller 6.

At time 01 in FIG. 7, the subsidiary plunger solenoid 25 is ON in the PLAY mode simultaneously with or subsequent to energization of the main plunger solenoid 24. With the subsidiary plunger solenoid 25 turned on, the subsidiary link 41 moves in its rearward direction due to retraction of the plunger 25a into the subsidiary plunger solenoid 25, as indicated at the arrow C in FIG. 2. The transmission arm 44 rotates clockwise on the rod 23 so as to be spaced at a distance "d" from the stopper 42c. The clockwise rotation of the transmission arm 44 allows the tension coil spring 46 to urge the guide arm 42 rearward. The guide arm 42 moves rearward so that the main link 28 connected via the pin 29 to the guide arm 42 moves rearward. The rearward movement of the main link 28 causes the transmission link 32 to rotate clockwise on the pin 30. As a result, the oscillating arm 35 supported on the transmission link 32 via the pin bracket 39 rotates clockwise to urge the pinch roller 7 against the capstan roller 6. Accordingly, the force applied to the pinch roller 7 by the pinch roller engaging piece 37 increases as a result of the energization of both of the main and subsidiary plunger solenoids 24 and 25.

In PINCH ON STOP mode of FIG. 7, the travel of the magnetic tape 5 is interrupted. The main plunger solenoid 24 is OFF while the subsidiary plunger solenoid 25 is ON. accordingly, the force applied to the pinch roller 7 is caused only by energization of the subsidiary plunger solenoid 25 and is smaller than the force applied when the main plunger solenoid 24 is energized, since the biasing force of the tension coil spring 46 is smaller than that of the compression coil spring 40.

in SHUTTLE mode of FIG. 7 where travel speed of the magnetic tape 5 is controllable, the main and subsidiary plunger solenoids 24 and 25 are both OFF.

in STOP mode of FIG. 7, the main and subsidiary plunger solenoids 24 and 25 are OFF as in the SHUTTLE mode. Accordingly, at time 02, the pinch roller 7 is free from any force by the oscillating arm 35 urging it into contact with the capstan 6.

The pinch roller urging device of the present invention may be employed in and for another type of magnetic reading/recording apparatus.

What is claimed is:

1. A pinch roller urging device adapted for use in a magnetic tape recording and reading apparatus including a capstan and an associated pinch roller, comprising:
    a base;
    a primary link mechanism and an auxiliary link mechanism for urging said pinch roller against said capstan with a first force and a second force, respectively; and
    a main and a subsidiary drive means for respectively applying a main and subsidiary motive force to said primary link mechanism and said auxiliary link mechanism, respectively, said main and subsidiary drive means being secured to said base and connected to said primary link mechanism and said auxiliary link mechanism, respectively;
    wherein said primary and auxiliary link mechanisms are operatively coupled to each other so that said primary link mechanism is operable to selectively apply either one or both of said first and second forces for urging said pinch roller against said capstan.

2. A pinch roller urging device as claimed in claim 1, wherein said second force is smaller than said first force.

3. A device for applying force to a pinch roller urging device adapted for use in a magnetic recording and reading apparatus, comprising:
    a base;
    a primary link mechanism and an auxiliary link mechanism for applying a force to said pinch roller;
    a main drive means for operating said primary link mechanism, and a subsidiary drive means for operating said auxiliary link mechanism, said main and subsidiary drive means being secured to said base and connected to said primary and auxiliary link mechanisms, respectively; said primary and auxiliary link mechanisms being operatively coupled to each other so that said primary link mechanism is operated either by both or by one of said main and subsidiary drive means; wherein said primary link mechanism comprises a reciprocally movable main link, a transmission link pivotally mounted on said main link, and an oscillating arm pivotally mounted on the transmission link, and wherein said auxiliary link mechanism comprises a reciprocally movable subsidiary link, a transmission arm pivotally mounted on the subsidiary link, and a guide arm pivotally connected to the transmission arm through a biasing means.

4. A pinch roller urging device as claimed in claim 1, wherein said main and subsidiary drive means comprise plunger solenoids.

* * * * *